United States Patent [19]

Pasternak

[11] Patent Number: 5,391,438
[45] Date of Patent: Feb. 21, 1995

[54] POLYMER TREATING PROCESS

[75] Inventor: Mordechai Pasternak, Spring Valley, N.Y.

[73] Assignee: Texaco Inc., White Plains, N.Y.

[21] Appl. No.: 130,410

[22] Filed: Oct. 1, 1993

[51] Int. Cl.$^6$ ............................................. B32B 27/32
[52] U.S. Cl. .................................... 428/523; 427/322; 427/558; 522/33; 522/66; 522/126; 528/482
[58] Field of Search ................. 427/322, 558; 522/33, 522/66, 126; 528/492; 428/523

[56] References Cited

U.S. PATENT DOCUMENTS 5,039,549 8/1991 Nguyen et al. ................. 427/322 X
5,149,774 9/1992 Patel et al. ............................ 528/493

*Primary Examiner*—Michael Lusignan

[57] ABSTRACT

The surface of a polymer such as polypropylene, may be treated by contact with an amine donor such as ethylene diamine followed by irradiation with ultraviolet light of wave length of about 1800Å–2800Å to improve surface wettability.

17 Claims, No Drawings

POLYMER TREATING PROCESS

FIELD OF THE INVENTION

This invention relates to the treatment of polymer surfaces to improve surface properties including wettability, ahesivity, paintability, receptivity to printing, etc.

BACKGROUND OF THE INVENTION

As is well known to those skilled in the art, polyolefins, typified by polypropylene and polyethylene, possess surfaces which are characterized by their poor properties with respect to wettability, adhesivity, paintability, and by their inability to be readily printed. These properties may serve as a practical limitation to the uses to which these materials may be put. Background on this problem and prior efforts to solve it may be obtained from Mechanisms of Photophysical Processes and Photochemical Reactions in Polymers by J. F. Rabek, J. Wiley and Sons (1987) p339–350 *Photomodification of Polymer Surfaces.* and R. P. Singh, *Surface Grafting Onto Polypropylene—A Survey of Recent Developments,* Prog. Polymer. Sci, Vol 1.7., 251-281 (1992). Another reference is M. Pasternak et al *Photosubstitution of Benzyl Hydrogens with Alcoholic Moieties. Selective Formation of Alkylbenzene Carbinols* Tetrahedron Letters 24, 3439-3442 (1983). See also U.S. patent application Ser. No. 07/992,666 filed 18 Dec 1992.

It is an object of this invention to provide a polymer treating process to modify the surface properties of the polymer. Other objects will be apparent to those skilled in the art.

STATEMENT OF THE INVENTION

In accordance with certain of its aspects, this invention is directed to a method of treating the surface of a polyolefin polymer to modify the surface properties thereof which comprises contacting the surface of a charge polyolefin polymer with an amine donor thereby forming a polyolefin polymer with a surface bearing residues from said amine donor;

irradiating said surface bearing residues from said amine donor with ultraviolet (UV) irradiation of wavelength of 1800Å–2800Å thereby forming a polyolefin polymer having a surface of modified properties; and recovering said polyolefin polymer having a surface of modified properties.

DESCRIPTION OF THE INVENTION

The polymers which may be surface-treated by the method of this invention include polyolefins typified by polyethylene, polypropylene, polystyrene, etc. including copolymers thereof.

The polyolefin polymer, typically polypropylene polymer, may be characterized by a molecular weight $\overline{M}_n$ of about 10,000–500,000. It is particularly characterized by its surface properties. The wettability is poor—as determined by the Rame-Hart goniometer which reveals contact angle values. Typically these polymers have a contact angle of about 90° when tested with water. They are characterized by their low adhesivity. It is difficult to gain adherence of paint or ink to the surface.

In accordance with the method of this invention, the surface of the charge polymer is contacted with an amine donor. The amine-donor may be a gas preferably ammonia or an amine such as methyl amine. It is preferred to use a "liquid amine donor". The liquid amine donor may be ammonium hydroxide, a monoamine, or a polyamine.

When the amine donor is a liquid, it may preferably be employed neat i.e. without diluent/solvent or it may be in the form of solution in diluent/solvent. Typical diluent/solvents may include other amine donors which are liquids.

The amines which may be employed as amine donors may be heterocyclic amines or they may be characterized by the formulae R-NH$_2$ or R$_2$NH or R$_3$N or H$_2$N(RNHR$_3$)$_n$NH$_2$ or H$_2$NR"OH. In the amine compound, R may be a hydrogen or a hydrocarbon group selected from the group consisting of alkyl, aralkyl, cycloalkyl, aryl, and alkaryl, including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a nonreactive substituent such as alkyl, aryl, cycloalkyl, ether, etc. Typical inertly substituted R groups may include 2-ethoxyethyl, carboethoxymethyl, 4-methylcyclohexyl, etc. The preferred R groups may be lower alkyl, i.e. C$_1$–C$_{10}$ alkyl, groups including e.g. methyl, ethyl, n-propyl, i-propyl, butyls, amyls, hexyls, octyls, decyls, etc. R may preferably be ethyl.

Typical primary amines R-NH2 may include n-butyl amine, octyl amine, aniline, and cyclohexyl amine. Typical secondary amines R$_2$NH may include di-n-butyl amine, etc. Typical tertiary amines R$_3$N may include tri ethyl amine, tri-n-propyl amine. Typical heterocyclic amines may include pyridine, lutadine, picoline, etc.

The amines may include inert substituents, typified by hydroxyl. These compositions may be typified by mono-ethanolamine, diethanolamine, or triethanolamine.

A particularly active group of amines are polyamines typified by those having the formula R-(NR")$_n$R or H$_2$N(R"NR)$_n$NH$_2$ or R(NR")$_n$NNH$_2$ wherein n is an integer.

In the above formula, R" may be a hydrocarbon group selected from the group consisting of alkylene, aralkylene, cycloalkylene, arylene, and alkarylene, including such radicals when inertly substituted. When R" is alkylene, it may typically be methylene, ethylene, n-propylene, isopropylene, n-butylene, i-butylene, sec-butylene, amylene, octylene, decylene, octadecylene, etc. When R" is aralkylene, it may typically be benzylene, beta-phenylethylene, etc. When R" is cycloalkylene, it may typically be cyclohexylene, cycloheptylene, cyclooctylene, 2-methylcycloheptylene, 3-butylcyclohexylene, 3-methylcyclohexylene, etc. When R" is arylene, it may typically be phenylene, naphthylene, etc. When R" is alkarylene, it may typically be tolylene, xylylene, etc. R" may be inertly substituted i.e. it may bear a non-reactive substituent such as alkyl, aryl, cycloalkyl, ether, etc. Typically inertly substituted R" groups may include cyclohexylene, etc. The preferred R" groups may be lower alkylene, i.e. C$_1$–C$_{10}$ alkylene, groups including e.g. methylene, ethylene, n-propylene, i-propylene, butylene, amylene, hexylene, octylene, decylene, etc. R" may preferably be ethylene —$CH_2CH_2$—.

Typical monoamines may include propyl amine, triethyl amine, and aniline. Typical polyamines may include ethylenediamine, diethylene triamine, and triethylene tetramine. Typical hydroxy amines may include ammonium hydroxide, ethanolamine, and diethanolamine.

The preferred amine compositions include

TABLE

| |
|---|
| $NH_4OH$ (aq) |
| Aniline |
| Ethanolamine |
| Triethylamine |
| Ethylene diamine |
| Diethylene triamine |

The most preferred amine donor compounds are polyamines typified by diethylene triamine or more preferably ethylene diamine.

It is a feature of the process of this invention that it is preferably carried out in the presence of a photosensitizer which aids in transfer of energy to the charge composition. A photosensitizer may also serve as photoinitiator and abstracts hydrogen to form reactive sites. A preferred class of photosensitizers is that containing ketone functionality including aliphatic ketones such as acetone, 2-butanone (i.e. methyl ethyl ketone), etc. Aromatic ketones may be employed typified by benzophenone or xanthone. Ketones containing both aromatic and aliphatic moieties (such as acetophenone) may be employed. Quinones such as anthraquinone, or azo compounds (such as azobisisobutyronitrile) or polycyclic hydrocarbons (such as anthracene) may also be employed as photosensitizers. Dyes (such as methylene blue) may also be photosensitizers when the irradiation is carried out in the visible range above 4000Å.

Photosensitizers may also be compounds of metals of Group VIII (those designated Groups 8, 9, and 10 in the New Notation) including Iron Fe, Cobalt Co, Nickel Ni, Ruthenium Ru, Rhodium Rh, Palladium Pd, Osmium Os, Iridium Ir, and Platinum Pt. Preferred of this group is ruthenium, preferably $RuCl_2$ as its dipyridyl complex. Other specific compounds which may be employed may include:

TABLE

| |
|---|
| $FeCl_2$ |
| $Co(NO_3)_2$ |
| $Ni(NO_3)_2$ |
| $PdCl_2$ |

When photoinitiator/sensitizers are employed, they may be present in amount of 1-10 parts, say 5 parts per 100 parts of charge composition.

Contacting is preferably effected by immersion in a body of amine donor (containing photosensitizer) at 20° C.-60° C., preferably 20° C.-40° C., say 25° C. for 10-60 minutes, preferably 20-40 minutes, say 30 minutes. In the case of gaseous amine donor (typically ammonia), the charge polymer is contacted with the gas—preferably in a closed chamber. During immersion and contact, a portion of the liquid or gaseous amine donor may be adsorbed thereon as a film—although there is no visual evidence of this.

The wetted surface bearing residues of amine-donor (and photosensitizer) is irradiated. The film or residue of donor retained on the polymer surface is generally not visible to the naked eye.

Irradiation may be effected using ultraviolet irradiation of wave length of about 1800Å-2800Å, typically about 1840Å-2540Å. Radiation above 2800Å and particularly above about 3000Å shows results which are generally unsatisfactory as indicated by a contact angle as measured by the Rame-Hart goniometer.

Irradiation is typically carried out at 20° C.-50° C., preferably 20° C.-40° C., say 30° C. for 60-240 minutes, preferably about 240 minutes. Use of a light source of higher intensity may permit operation to be carried out for a shorter period of time. At the conclusion of irradiation, the polymer is typically found to be characterized by a contact angle which may be as low as about 30°, and typically is about 50°-70°. This is correlative with improved wettability which may lead to paintability, adhesivity, and receptivity to print.

The product polymer may be readily painted or imprinted; and may be used in the form of packaging material, containers, auto parts, etc.

DESCRIPTION OF PREFERRED EMBODIMENTS

Practice of the method of this invention will be apparent to those skilled in the art from the following examples wherein all parts are parts by weight when otherwise stated. An asterisk (*) designates a control example.

EXAMPLE I

In this example, a 750 micron film of polypropylene is immersed for 30 minutes at 25° C. in ethylene diamine (amine donor) containing 20 w % acetone (sensitizer/initiator). At the end of this period, the sample (2 cm×5 cm) is removed from the liquid and no visible film of liquid appears to be present.

It is then irradiated for 240 minutes in air with ultraviolet irradiation of wavelength of 1849Å-2537Å which is obtained from a Rayonet Photochemical Reactor equipped with 16 interchangeable lamps. Each lamp has an output of about 35 watts and irradiation of $1.65 \times 10^{16}$ photons/sec/cm$^3$. Irradiation is carried out at 30° C. for 240 minutes.

The contact angle of the so-treated surface of the polymer is found to be 30°—that of the charge polymer is about 90°. This clearly indicates that the surface is characterized by improved wettability.

EXAMPLES II-IX

In this series of Examples, the procedure of Example I is generally followed. The amine donor is a monoamine—either triethylamine or aniline. The film thickness is either 75 microns or 750 microns. The runs were made with and without acetone sensitizer. In the series of Examples (as in all others which follow) sensitizer/initiator when present is present in amount of 10-20 w %. Contact with amine donor is for a period of 30 minutes at 25° C.; and irradiation is carried out at 30° C. for 240 minutes.

TABLE

| | PHOTOSUBSTITUTION WITH MONOAMINES | | | |
|---|---|---|---|---|
| Examples | SOURCE OF AMINE GROUP | FILM THICKNESS microns | SENSITIZER/ INITIATOR | CONTACT ANGLE (°) |
| II | Triethylamine | 75 | — | 62 |

TABLE-continued

PHOTOSUBSTITUTION WITH MONOAMINES

| Examples | SOURCE OF AMINE GROUP | FILM THICKNESS microns | SENSITIZER/ INITIATOR | CONTACT ANGLE (°) |
|---|---|---|---|---|
| III | Triethylamine | 75 | Acetone | 60 |
| IV | Triethylamine | 750 | — | 63 |
| V | Triethylamine | 750 | Acetone | 42 |
| VI | Aniline | 75 | — | 59 |
| VII | Aniline | 75 | Acetone | 62 |
| VIII | Aniline | 750 | — | 53 |
| IX | Aniline | 750 | Acetone | 51 |

From the above Table, it is apparent that photosubstitution in the presence of monoamines permits attainment or product polypropylene which is characterized by improved wettability i.e. contact angles as low as 51°.

EXAMPLES X-XVII

In this series of Examples, the procedure outlined in Examples II-IX is followed. The amine donor is a polyamine.

TABLE

PHOTOSUBSTITUTION WITH POLYAMITIES

| Examples | SOURCE OF AMINE GROUP | FILM THICKNESS microns | SENSITIZER/ INITIATOR | CONTACT ANGLE(°) |
|---|---|---|---|---|
| X | Ethylenediamine | 75 | — | 43 |
| XI | Ethylenediamine | 75 | Acetone | 42 |
| XII | Ethylenediamine | 750 | — | 45 |
| XIII | Ethylenediamine | 750 | Acetone | 30 |
| XIV | Diethylenetriamine | 75 | — | 49 |
| XV | Diethylenetriamine | 75 | Acetone | 43 |
| XVI | Diethylenetriamine | 750 | — | 29 |
| XVII | Diethylenetriamine | 750 | Acetone | 40 |

From the above Table, it is apparent that contact with polyamines followed by irradiation permits attainment of polypropylene of excellent wettability characterized by contact angle as low as 29°.

EXAMPLES XVIII-XXV

In this series of Examples, the procedure outlined in Examples II-IX is followed. The amine donor is ethanolamine. The sensitizer/initiators include:

(i) the Irgacure 500 brand of (Ciba-Geigy) ketone containing a 1:1 weight mixture of benzophenone and 1-hydroxycyclohexyl phenyl ketone; and (ii) the Darocur 1173 brand of (Ciba-Geigy) ketone-2-hydroxy-2-methyl-1-phenylpropane-1-one.

TABLE

PHOTOSUBSTITUTION WITH ETHANOLAMINE

| Examples | FILM THICKNESS microns | SENSITIZER/ INITIATOR | CONTACT ANGLE(°) |
|---|---|---|---|
| XVIII | 75 | — | 57 |
| XIX | 75 | Acetone | 54 |
| XX | 75 | Irgacure 500 | 54 |
| XXI | 75 | Darocur 1173 | 57 |
| XXII | 750 | — | 39 |
| XXIII | 750 | Acetone | 54 |
| XXIV | 750 | Irgacure 500 | 56 |
| XXV | 750 | Darocur 1173 | 40 |

From the above Table, it is apparent that the use of ethanolamine permits attainment of product polypropylene having contact angle of 39°-57°.

TABLE

PHOTOSUBSTITUTION WITH AMMONIUM HYDROXIDE

| Examples | FILM THICKNESS microns | SENSITIZER/ INITIATOR | CONTACT ANGLE(°) |
|---|---|---|---|
| XXVI | 75 | — | 62 |
| XXVII | 75 | Acetone | 60 |
| XXVIII | 75 | Acetophenone | 62 |
| XXIX | 750 | — | 61 |
| XXX | 750 | Acetone | 62 |
| XXXI | 750 | Acetophenone | 68 |

From the above Table, it is apparent that use of ammonium hydroxide as amine donor permits attainment of contact angles as low as 60°.

EXAMPLES XXXII-XXXIV

In the following examples, X-ray photoelectron spectroscopy (XPS) measurements of C, N, and O content, and reflectance IR, of selected samples photosubstituted with di- and tri-amines show formation of amide functionality as a result of partial oxidation. The N/O ratio of about 1 indicate the presence of NCO linkages; and the absorption peaks of N-H and CO in the IR further confirm the existence of amide groups.

TABLE

XPS AND IR DATA WHICH SHOW THE AMIDE FORMATION IN THE PHOTOSUBSTITUTION WITH AMINES

| Examples | SOURCE OF AMINE | % CARBON (XPS) | % NITROGEN (XPS) | % OXYGEN (XPS) | N/O | IR (CM$^{-1}$) |
|---|---|---|---|---|---|---|
| XXXII | Ethylenediamine (Example XII) | 71 | 14.6 | 13.0 | 1.12 | 3287,1663,1558 |
| XXXIII | Ethylenediamine (Example XIII) | 67 | 16.6 | 14.0 | 1.18 | 3287,1662,1563 |
| XXIV | Diethylenetriamine (Example XVI) | 78 | 10.5 | 9.0 | 1.17 | 3264,1656,1558 |

Although this invention has been illustrated by reference to specific embodiments, it will be apparent to those skilled in the art that various changes and modifications may be made which clearly fall within the scope of the invention.

What is claimed:

1. The method of preparing a polyolefin polymer having a surface of modified properties by treating a polyolefin polymer surface to modify the surface properties thereof which comprises contacting the surface of a polyolefin polymer with an amine donor thereby forming a polyolefin polymer with a surface bearing residues of said amine donor;

irradiating said surface bearing residues from said amine donor with ultraviolet irradiation of wave length of 1800Å–2800Å thereby forming said polyolefin polymer having a surface of modified properties; and recovering said surface modified polyolefin polymer.

2. The method as claimed in claim 1 wherein said polyolefin is polypropylene.

3. The method as claimed in claim 1 wherein said polyolefin is polyethylene.

4. The method as claimed in claim 1 wherein said amine donor is ammonia, hydroxylamine, ammonium hydroxide, or a polyamine.

5. The method as claimed in claim 1 wherein said contacting is effected at 20° C.–40° C.

6. The method as claimed in claim 1 wherein said irradiating is carried out with ultraviolet irradiation of wavelength of 1840Å–2540Å.

7. The method as claimed in claim 1 wherein said amine donor is ammonia.

8. The method as claimed in claim 1 wherein said amine donor is ethylene diamine.

9. The method as claimed in claim 1 wherein said amine donor is diethylene triamine.

10. The method as claimed in claim 1 wherein said amine donor is ethanolamine.

11. The method as claimed in claim 1 wherein said contacting is carried out in the presence of a photosensitizer.

12. The method as claimed in claim 11 wherein said photosensitizer is a ketone, a dye, or a compound of a metal of Group VIII.

13. The method as claimed in claim 12 wherein said photosensitizer is an aliphatic ketone.

14. A method of preparing a polypropylene polymer having surface modified properties by treating a surface of a polypropylene polymer to modify the surface properties thereof which comprises contacting the surface of the polypropylene polymer with a liquid containing an amine to form a wetted surface;

irradiating said wetted surface bearing a film of liquid containing an amine with ultraviolet radiation of wavelength of 1800Å–2800Å thereby forming said polypropylene polymer having a surface of modified properties; and recovering said surface-modified polypropylene polymer.

15. A polyolefin polymer of modified surface properties prepared by the process which comprises contacting surface of a polyolefin polymer with an amine donor thereby forming a polyolefin polymer with a surface bearing residues of said amine donor composition;

irradiating said surface bearing residues of amine donor with ultraviolet irradiation of wave-length of 1800Å–2800Å thereby forming said polyolefin polymer having a surface of modified properties; and recovering said polyolefin polymer having a surface of modified properties.

16. A polyolefin polymer as claimed in claim 15 wherein said polyolefin polymer is a polyethylene.

17. A polyolefin polymer as claimed in claim 16 wherein said polyolefin polymer is a polypropylene.

* * * * *